Sept. 20, 1932.  H. P. SCHRANK  1,877,988
PNEUMATIC TIRE
Filed Feb. 1, 1932
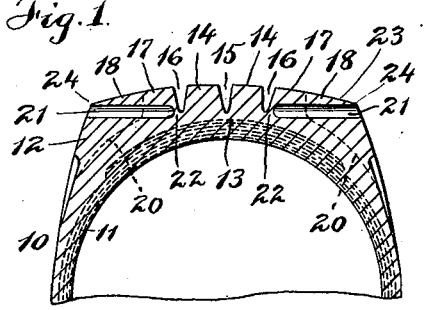
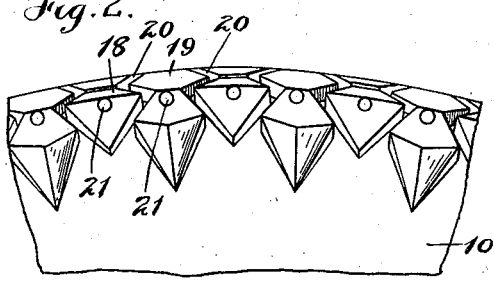
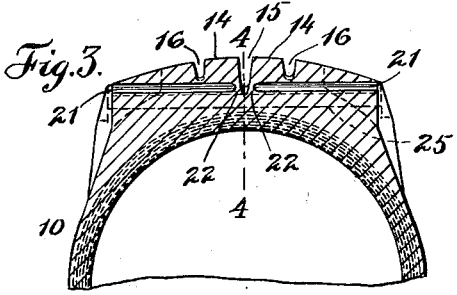
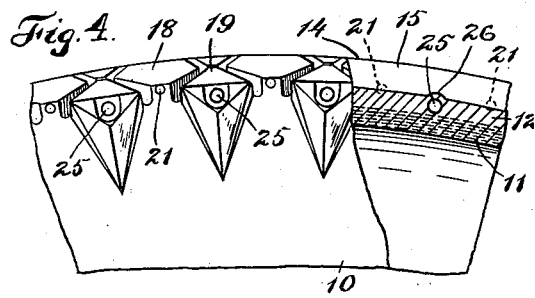
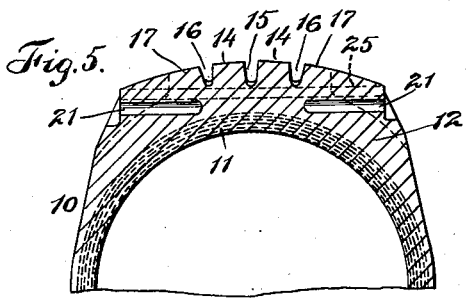
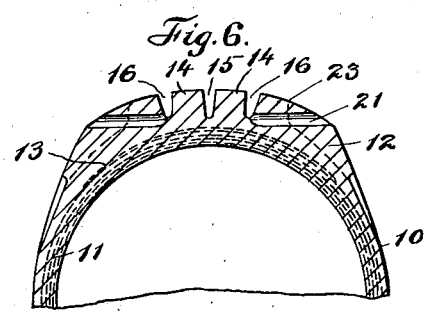

Patented Sept. 20, 1932

1,877,988

UNITED STATES PATENT OFFICE

HARRY P. SCHRANK, OF AKRON, OHIO, ASSIGNOR TO SEIBERLING RUBBER COMPANY, OF BARBERTON, OHIO, A CORPORATION OF DELAWARE

PNEUMATIC TIRE

Application filed February 1, 1932. Serial No. 590,009.

This invention relates to resilient tires and especially pneumatic tires having a rubber tread which is laterally apertured for the purpose of ventilating the tread, increasing its cushioning properties and developing non-skid projections in the tread as the result of wearing away of the latter into the apertures.

Heretofore the provision of lateral tread apertures has involved an increase in the depth of the tread rubber as compared with ordinary practice, especially where the apertures, for convenience in manufacture and avoidance of flexure cracks and premature breaking down of the tread rubber, have been run clear through the tread as perforations extending from one side to the other thereof. In some cases two rows of staggered perforations located at different depths have been used. The resulting increase of tread depth in either case has been beneficial in the way of increased tire mileage, but the tires have been more expensive because of the greater quantity of rubber employed.

My present invention has for its principal object to obtain the benefits of a laterally-apertured tread construction such as internal ventilation, improved cushioning and development of additional non-skid projections through wearing away into the apertures, in a tire tread having one or more rows of apertures, without requiring an increased depth of tread rubber as compared with average standard practice, or even with a reduction in the quantity of rubber while maintaining the standard depth, and without liability to flexure cracks and premature breaking down of the rubber. Such a tire is superior to those of the ordinary type and can be manufactured at substantially the same cost.

Of the accompanying drawing, Fig. 1 is a cross section of the outer part of a pneumatic tire casing constructed in accordance with my invention.

Fig. 2 is a side elevation thereof.

Fig. 3 is a cross section showing a modification.

Fig. 4 is a side elevation of said modification, partly broken away and in section, on the line 4—4 of Fig. 3.

Fig. 5 is a cross section of a second modification.

Fig. 6 is a cross section of a third modification.

Referring at first to Figs. 1 and 2, 10 indicates the tire casing as a whole including a carcass 11 of the ordinary bias-cut rubberized cord fabric plies, and a rubber tread 12 vulcanized thereon and merging into the rubber side-wall coverings. In this case I have represented a two-ply breaker strip 13 which may be composed of the usual bias-cut cord fabric with threads lying at opposite angles in the two plies or of other suitable breaker material, but a single-ply breaker may be used as in Fig. 6, or the breaker strip may be omitted as in Figs. 3 and 5.

The rubber tread is molded with an original set of anti-skid projections of any suitable form, in this case including in the middle zone thereof a pair of parallel ribs 14, either longitudinally continuous or interrupted, together with a longitudinal groove 15 separating the ribs and a pair of outer flanking grooves 16 separating the ribs from adjacent tread portions 17 which may be either longitudinally continuous or interrupted. From said tread portions 17 extend two rows of marginal tread projections 18, 19 separated by transverse grooves 20 and having their ends or shoulders extended some distance down the sides of the tire. The bottoms of the longitudinal grooves 15 and 16 preferably extend down nearly to the outer fabric ply, in this case to the outer ply of the breaker strip 13, which latter may be embedded in the usual cushion rubber, which is not separately shown.

In accordance with my present invention, the tread 12 is formed on each side with a set of transverse apertures 21 spaced in a row extending circumferentially around the tire and located in the marginal tread blocks or projections 18 and 19 and in the adjacent solid tread portions 17. These apertures are preferably parallel to the central tire axis, although not necessarily so. Said apertures in the present embodiment are located substantially at the level of the bottoms of the tread grooves 15, 16 and their lower sides, lying nearest the center or axis of rotation of the wheel or tire, are located substantially at the level of the outermost fabric ply, in this case that of the breaker strip, in order to reduce the depth of the tread rubber substantially to the average depth employed in standard tires of the same size, intended for the same duty.

Said apertures in this embodiment are furthermore closed at their inner ends and separated from the adjacent flanking longitudinal tread grooves 16 by rubber walls 22 of such relative thinness as to have no substantial load-supporting function in the tire, whereby the starting of flexure cracks in these end walls 22, which might tend to cause premature breaking down of the tread rubber, is avoided or greatly reduced.

The contour of the original molded wearing tread surface 23 is preferably somewhat convex, as shown, and in this instance tends somewhat toward the flat form, the outer ends of the apertures 21 being located wholly in the side faces or shoulders of the tread, but with their outer sides positioned immediately adjacent to the junction lines or corners 24 between the wearing surface and the side shoulders. A tread so constructed will wear away in its marginal portions into the apertures 21 before the middle ribs 14 are entirely worn down and before the marginal transverse grooves 20 are obliterated, thus dividing the marginal blocks 18, 19 and developing additional marginal non-skid projections.

In the operation of this form of my invention, the tire tread obtains internal ventilation and added marginal cushioning from the presence of the apertures 21, while the solid or unperforated middle ribs 14 provide an increased load-sustaining capacity and longer wear as compared with internally-apertured treads in which the apertures extend as perforations clear through from side to side of the tread. The provision of said apertures in two sets on the respective sides and their positioning radially of the tread with reference to the other elements of the tire casing, as described, results in reducing the original tread depth in the manner indicated, and reduces the cost of the tire by a saving in the amount of rubber employed, as compared with other apertured tires. The quantity of tread rubber of course may be even less than in an ordinary tire, by an amount corresponding to the aggregate volume of the apertures 21, without substantially detracting from the wearing qualities and with a marked improvement in ventilation and tread cushioning, as well as in anti-skid properties when the tread has worn through into the apertures.

In the modification illustrated in Figs. 3 and 4, two rows of transverse apertures 21 and 25, in accordance with a known arrangement which is not claimed broadly as my invention, are radially located in alternating or staggered arrangement in the tread at different levels which substantially coincide for the outer sides of the apertures 25 in the inner row and the inner sides of the apertures 21 in the outer row so as continuously to develop successive additional anti-skid projections through wearing away of the tread into the respective apertures, the outer ends of the apertures terminating at the shoulders of alternating tread blocks 18 and 19. The apertures 21 in the outer row are in two sets whose inner ends are closed and terminate short of the middle plane of the tire, but in this case their inner ends are shown as extended nearly up to the middle tread groove 15 and their level coincides substantially with that of the bottom of said middle groove, which is deeper than the two side grooves 16. At the bottom of said middle groove are shallow arches 26 of rubber, slightly raised above the level of the rest of the groove bottom, forming thin walls of rubber over the through apertures 25 to facilitate rapid wearing away of the tread into said apertures when the tread ribs 14 have become substantially obliterated. The short apertures 21 underlie the side grooves 16, the bottoms of which may be provided with similar rubber arches over said apertures. It will be noted that the radial location of these short apertures 21 in the tread, with reference to the other tire elements including the tread ribs and the middle groove 15, is such as to provide a relatively shallow tread for a tire having two sets of apertures located at different levels. In this case I prefer to make the short apertures 21 in the outer row, of smaller diameter than the inner row apertures 25, as it is found that this reduces the amount of depression of the rubber over these outer apertures, under load, and promotes evenness of tread wear, but do not claim this or the arches 26.

In both of the above-described embodiments, the thin rubber walls 22 between the ends of the apertures 21 and the adjacent tread groove or grooves may, if desired, be broken through by a suitable piercing operation after the tire has been molded and before being put into use, in order to increase the ventilating action by admitting and discharging air through both ends of the apertures.

In the modification shown in Fig. 5, which also includes staggered apertures in two rows at different levels which substantially coincide at the adjacent sides of the apertures in the respective rows so as to continuously develop successive additional anti-skid projections through tread wear, the arrangement of long and short apertures of the preceding modification is reversed, the through apertures or perforations 25 being in the outer row and of smaller diameter than those in the inner row and the short apertures 21 being in the inner row, with their lower sides substantially at the level of the outer fabric ply in the carcass 11, and their inner ends being closed and terminating substantially at a plane normal to the central tire axis and coinciding with the outer sides of the tread grooves 16 as in the embodiment illustrated in Figs. 1 and 2, so that here also the apertures 21 are radially located in the tread with reference to other tire elements, including the outer carcass plies, to provide a relatively-shallow tread for a tire having two rows of apertures located at different levels. In this case the inner ends of the short apertures are separated from the bottoms of the grooves 16 by comparatively thick walls of rubber to allow for the presence of the outer row of apertures 25, but the tendency to cracking of the rubber adjacent the closed inner ends of said apertures 21, through flexure of the tread under load, is avoided or reduced by locating said inner ends, as described, substantially at the plane of the outer sides of the grooves 16 and thus avoiding the presence of any substantial thickness of load-sustaining rubber over said aperture ends at this plane.

In Fig. 6 is represented a third modification wherein the apertures 21 are extended clear through the marginal tread portions into the flanking circumferential grooves 16 so that they are open at both ends. Any films of rubber which may form over the inner ends of these apertures through unavoidable clearances between the ends of the aperture-forming pins and the mold ribs which form the grooves would be so thin as to be more or less perforated in most cases and readily broken down through flexure of the tread wall. The groove-forming mold ribs could, if desired, be more or less indented to receive the free ends of the aperture-forming pins. This view also shows the outer ends of the apertures as terminating in the original wearing surface 23 of the tread which is somewhat more convex than in the preceding views, but this feature is not claimed as a part of my invention.

It will be understood that the invention is not limited as to the exact shape of the tread apertures and modifications additional to those described might be made without departing from the scope of the invention as defined in the claims.

I claim:

1. In a resilient tire, a rubber tread formed with a longitudinal groove and with transverse internal apertures terminating at their inner ends short of the middle plane of the tire, substantially at a plane normal to the central tire axis and coinciding with said groove.

2. A pneumatic tire having fabric elements and a rubber tread formed with anti-skid elements and also with lateral internal apertures including sets of apertures on the respective sides terminating short of the middle longitudinal plane of the tires, said short apertures being radially located in the tread with reference to other tire elements to provide a relatively-shallow tread.

3. A pneumatic tire having fabric plies and a rubber tread thereon, said tread being formed with apertures extending thereinto from opposite sides and terminating at their inner ends short of the middle plane of the tire, the sides of said apertures nearest the central tire axis being located substantially at the level of the outermost of said fabric plies.

4. A resilient tire having a rubber tread formed with a longitudinally grooved portion in the middle zone thereof, the side portions of said tread being formed with respective sets of internal, transverse apertures inwardly terminating substantially at the plane of the outer edges of said grooved portion.

5. A pneumatic tire comprising a carcass and a rubber tread thereon formed in its middle zone with longitudinal anti-skid projections and flanking longitudinal grooves and formed in its side portions with marginal anti-skid projections and separating transverse grooves, said tread being also formed on each side in said marginal projections with a set of internal, transverse apertures inwardly terminating substantially at the adjacent flanking longitudinal groove.

6. A resilient tire having a rubber tread formed with a longitudinal groove and with a set of internal, transverse apertures located substantially at the level of the bottom of said groove, said apertures having closed inner ends separated from said groove by relatively-thin rubber walls having substantially no load-supporting function.

7. A resilient tire having a rubber tread formed in its middle tread zone with a circumferential rib structure and adjacent flanking grooves, and sets of lateral perforations in the respective marginal portions of the tread, extending laterally inward from the sides thereof, said perforations at their inner ends communicating with and terminating at said grooves.

8. A resilient tire having a rubber tread formed with original anti-skid projections and with two rows of transverse apertures alternating in the tread at different levels which substantially coincide for the outer sides of the apertures in the inner row and the inner sides of the apertures in the outer row, to continuously develop successive sets of additional anti-skid projections through wearing away of the tread into the respective rows of apertures, the apertures in one row extending as perforations clear through from one side of the tread to the other, and the apertures in the other row being in two sets whose inner ends terminate short of the middle plane of the tire.

In witness whereof I have hereunto set my hand this 28th day of January, 1932.

HARRY P. SCHRANK.